US008266135B2

(12) United States Patent
Chen et al.

(10) Patent No.: US 8,266,135 B2
(45) Date of Patent: Sep. 11, 2012

(54) INDEXING FOR REGULAR EXPRESSIONS IN TEXT-CENTRIC APPLICATIONS

(75) Inventors: Ting Chen, Madison, WI (US);
Rajasekar Krishnamurthy, Campbell, CA (US); Shivakumar Vaithyanathan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 12/348,594

(22) Filed: Jan. 5, 2009

(65) Prior Publication Data

US 2010/0174718 A1 Jul. 8, 2010

(51) Int. Cl.
G06F 7/00 (2006.01)
G06F 17/30 (2006.01)
(52) U.S. Cl. ...................................................... 707/711
(58) Field of Classification Search ........... 707/999.004, 707/711
See application file for complete search history.

(56) References Cited

U.S. PATENT DOCUMENTS

| 2004/0267721 | A1* | 12/2004 | Meyerzon et al. | 707/3 |
| 2005/0097092 | A1* | 5/2005 | Annau et al. | 707/3 |
| 2005/0114313 | A1* | 5/2005 | Campbell et al. | 707/3 |
| 2009/0070327 | A1* | 3/2009 | Loeser et al. | 707/6 |
| 2010/0017388 | A1* | 1/2010 | Glover | 707/5 |

OTHER PUBLICATIONS

Sun Wu et al., Fast text searching: allowing errors. Commun. ACM, 35(10): 83-91, 1992.
Bazca-Yates et al., Fast text searching for regular expressions or automaton searching on tries. Journal of the ACM, 43(6):915-936,1996.
Brin, Extracting patterns and relations from the world wide web. Proceedings of WebDE Workshop.EDBT, 98, 98.
Soderland, Learning information extraction rules for semi-structured and free text. Machine Learning, 1999.
Agichtein et al., Snowball: Extracting relations from large plain-text collections. Proceedings of the 5th ACM International Conference on Digital Libraries, 2000.
Caruana et al., A High Precision Workbench for Extracting Information from the Protein Data Bank (PDB). Knowledge and Data Discovery (KDD) Workshop on Text and Information Extraction, 2000.
Cooper et al., A fast index for semi structured data. VLDB 01: Proceedings of the 27th International Conference on Very Large Data Bases, pp. 341-350, 2001.
Hopecroft et al., Introduction to automata theory, languages, and computation, 3rd edition, 2007, pp. 2-4, 37-80, 151-153, 234, 322, and 528-529.
Cho et al., A fast regular expression indexing engine. ICDE02: Proceedings of the 18th International Conference on Data Engineering, p. 419, 2002.

(Continued)

*Primary Examiner* — Robert Beausoliel, Jr.
*Assistant Examiner* — Nicholas Allen
(74) *Attorney, Agent, or Firm* — Lieberman & Brandsdorfer, LLC

(57) ABSTRACT

A method, system, and article are provided for evaluating regular expressions over large data collections. A general purpose index is built to handle complex regular expressions at the character level. Characters, character classes, and associated metadata are identified and stored in an index of a collection of documents. Given a regular expression, a query is generated based on the contents of the index. This query is executed over the index to identify a set of documents in the collection of documents over which the regular expression can be evaluated. Based upon the query execution, the identified set of documents is returned for evaluation by the regular expression responsive to execution of the query over the index.

20 Claims, 8 Drawing Sheets

OTHER PUBLICATIONS

Diao et al., YFilter: Efficient and scalable filtering of XML documents. Proceedings of the 18th International Conference on Data Engineering, 2002.

Chan et al., Re-tree: an efficient index structure for regular expressions. The VLDB journal, 12(2):102-119, 2003.

Hore et al., Indexing text data under space constraints. CIKM 04: Proceedings of the thirteenth ACM international conference on Information and knowledge management, pp. 198-207, 2004.

Etzioni et al., Unsupervised named-entity extraction from the web: An experimental study. Artificial Intelligence, 2005.

Chandel et al., Efficient batch top-k search for dictionary-based entity recognition. ICDE, 2006.

Rosenfeld et al., Ures: an unsupervised web relation extraction system. Proceedings of the COLING/ACL, 2006.

Yu et al., Fast and memory-efficient regular expression matching for deep packet inspection. ANCS06: Proceedings of ACM/IEEE Symposium on Architectures for Networking and Communications Systems, 2006.

Ramakrishnan et al., Entity annotation using inverse index operations. Empirical Methods in Natural Language Processing (EMNLP 2006), 2006.

Jayram et al., Avatar information extraction system. IEEE Data Engineering Bulletin, May 2006.

Li et al., Getting work done on the web: supporting transactional queries. SIGIR '06: Proceedings of the 29th annual international ACM SIGIR conference on Research and development in information retrieval, pp. 557-564, 2006.

Zhu et al., Navigating the intranet with high precision. WWW '07: Proceedings of the 16th annual international conference on World Wide Web, pp. 491-500, 2007.

Derose et al., Building structured web community portals: A top-down compositional, and incremental approach. VLDB-07, 2007.

Shen et al., Declarative information extraction using datalog with embedded extraction predicates. Proceedings of VLDB2007, 2007.

Cox, Russ, "Regular expression matching can be simple and fast (but is slow in java, perl, php, phyton, ruby, . . . )." http://swtch.com/rsc/regexp.html.

Enron Dataset, http://www-2.cs.cmu.edu/enron.

http://www.gnu.org/software/grep.

Regular Expression in Java, http://java.sun.com/docs/books/tutorial/essential/regex.

Online regular expression library, http://regexlib.com.

University of Michigan Web collection, http://www.eecs.umich.edu/db/transactionalSearch/.

* cited by examiner

INDEXING FOR REGULAR EXPRESSIONS IN TEXT-CENTRIC APPLICATIONS

BACKGROUND OF THE INVENTION

1. Technical Field

This invention relates to extracting information from regular expressions. More specifically, the invention relates to building a general purpose index to handle complex regular expressions at the character level.

2. Description of the Related Art

A regular expression, hereinafter referred to as regex, is a set of pattern matching rules encoded in a string according to certain syntax rules. More specifically, regex is a string which defines a set of strings satisfying a pattern. A regex can be specified using a number of syntactic methods. It is widely used as the pattern specification language in applications such as information extraction, network packet scanning and filtering, information dissemination, and document search tools. Regex expression evaluation has become a fundamental operation for information searching, mining, and extraction over a text database.

One prior approach for extracting structured information from text executes extraction rules over individual documents. This form of information extraction is based upon the quality of rules employed. An information extraction rule developer hypothesizes some initial rules, followed by an iterative trial and error process for modifying the initial rules. Multiple arbitrary regexs are evaluated over a large text collection for an exploratory task. However, problems arise with large text collections, wherein the time employed for the information extraction increases significantly. One solution for reducing time for implementing the extraction rules is to pre-process the documents and create an index so that for any specific regex only the documents that contain at least one match are examined.

FIG. 1 is a prior art block diagram (100) of architecture for exploiting indexes in regex evaluation. There are two primary modules, an offline indexing module (110) to digest the document collection and to create an index (130), and a run-time module (120) to exploit the index and filter documents guaranteed not to contain a match for a given query. The indexing module (110) receives documents (105), and the run-time module (120) receives regex queries (140) and returns documents containing a match (150) in response to consulting the index (130). The offline indexing module (110) is employed to create an index that can support regex queries to properly filter returned documents. In a prior art multigram index, the following regex query: \p {alpha} {1, 12}@\p{alpha}{1, 10}.edu, is efficiently supported in the prior art structure. More specifically, the regex expression is properly supported by the index because of the presence of the .edu string in the expression, which is a multigram present in the index and can be used to filter documents. When the input regex does not have select multigram strings, such as: \p {alpha} {1,12}@\p{alpha}{1,10}\.\p{alpha}{1,10}, the index cannot properly filter the regex input query. In general, for complex regular expressions that may not contain a multigram string, the index cannot filter documents effectively.

Applications, such as information extraction, evaluate complex regex queries, consisting of regex constructs, including but not limited to character classes, groups, quantifiers, disjunctions, etc. Both the prior art offline indexing module (110) and the run-time module (120) are not configured to address the challenges associated with processing complex regex queries. To fully exploit an index while ensuring that the system can handle arbitrary regexs is challenging.

Accordingly, there is a need to build a filter index that supports complex regex queries to eliminate documents guaranteed not to contain a match for the query evaluation. Such a filter index supports the complex regex evaluation over fewer documents, thereby improving overall execution time in query evaluation.

SUMMARY OF THE INVENTION

This invention comprises a method, system, and article for efficiently indexing regexs with an indexing policy that accounts for both characters and character classes.

In one aspect of the invention, a method is provided for building an electronic index to support efficient evaluation of complex regular expressions. Index feature classes are specified to identify metadata to be stored in an index of a collection of documents. The feature classes are applied over the collection of documents to generate the electronic index storing the metadata, which is followed by receipt of the query regular expression. A query based on the regular expression is generated. The query is composed of multiple constraints with each constraint associated with one of the feature classes. The query is executed over the index to identify a set of documents in the collection of documents over which the regular expression query can be evaluated. Following execution of the query over the index, the identified set of documents is returned for evaluation by the regular expression.

In another aspect of the invention, a computer system is provided with a processor unit in communication with memory, and an index manager in communication with the memory. The index manager is responsible for building an index to support efficient evaluation of complex regular expressions. The index manager comprises an index feature manager in communication with a feature class manager. The index feature manager specifies index feature classes to identify metadata to be store in an index of a collection of documents. The feature class manager applies the feature classes over the collection of documents to generate the index storing the metadata. The index manager is in communication with a run time manager. More specifically, the run time manager generates a query based on the regular expression. The query includes multiple constraints, with each constraint associated with one of the feature classes. In response to receipt of a query regular expression, the execution manager executes a query on the regular expression over the index. This execution identifies a set of documents in the collection of documents over which the regular expression query can be evaluated. A set of the identified documents are returned for evaluation by the regex.

In yet another aspect of the invention, an article is provided with a computer-readable carrier including computer program instructions configured to build an index to support efficient evaluation of complex regular expressions. Instructions are provided to specify index feature classes to identify metadata to be stored in an index of a collection of documents. Additionally, instructions are provided to apply the feature classes over the collection of documents to generate the index storing the metadata. In response to receipt of the query regular expression, instructions are provided to generate a query based on the regular expression. The query is composed of multiple constraints and with each constraint associated with one of the feature classes. Instructions to execute the query over the index to identify a set of documents in the collection of documents over which the regular expression query can be evaluated. The identified set of documents is returned for evaluation by the regular expression.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
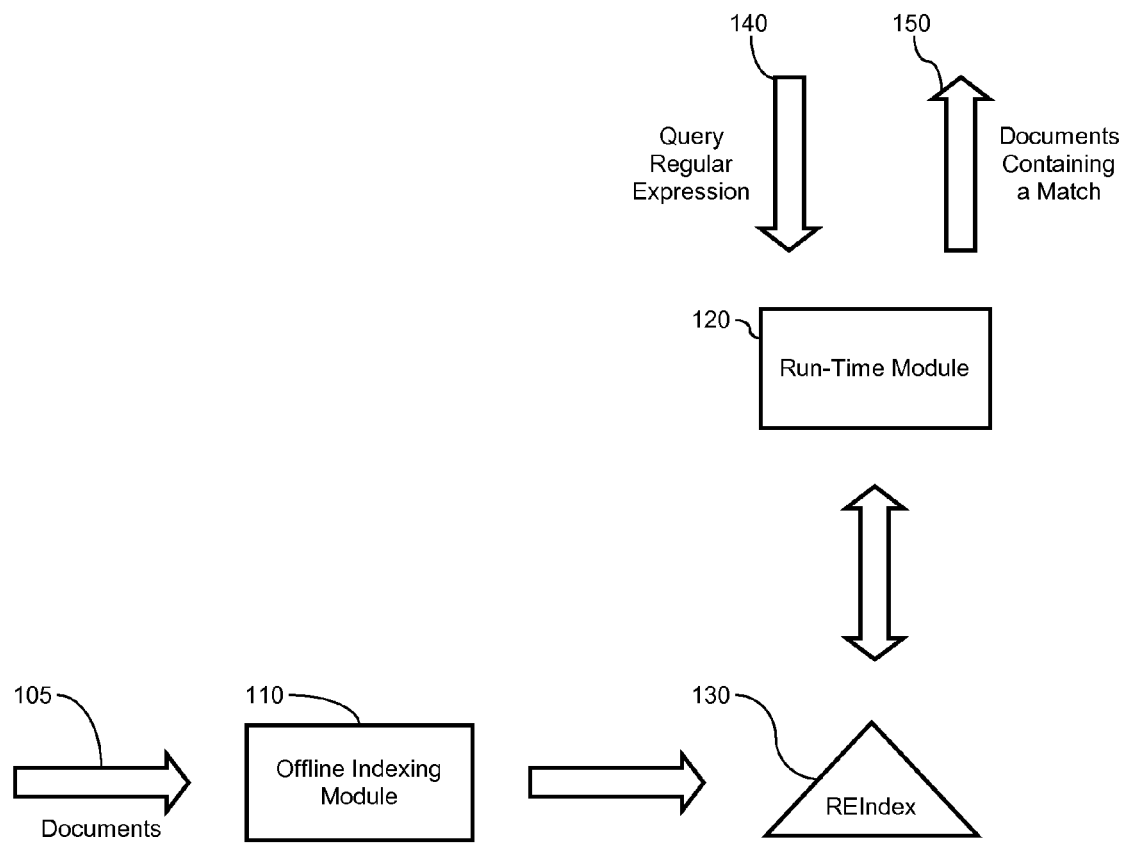
FIG. 1 is a block diagram of a prior art architecture for exploiting indexes in regex evaluation.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

Figure 2:
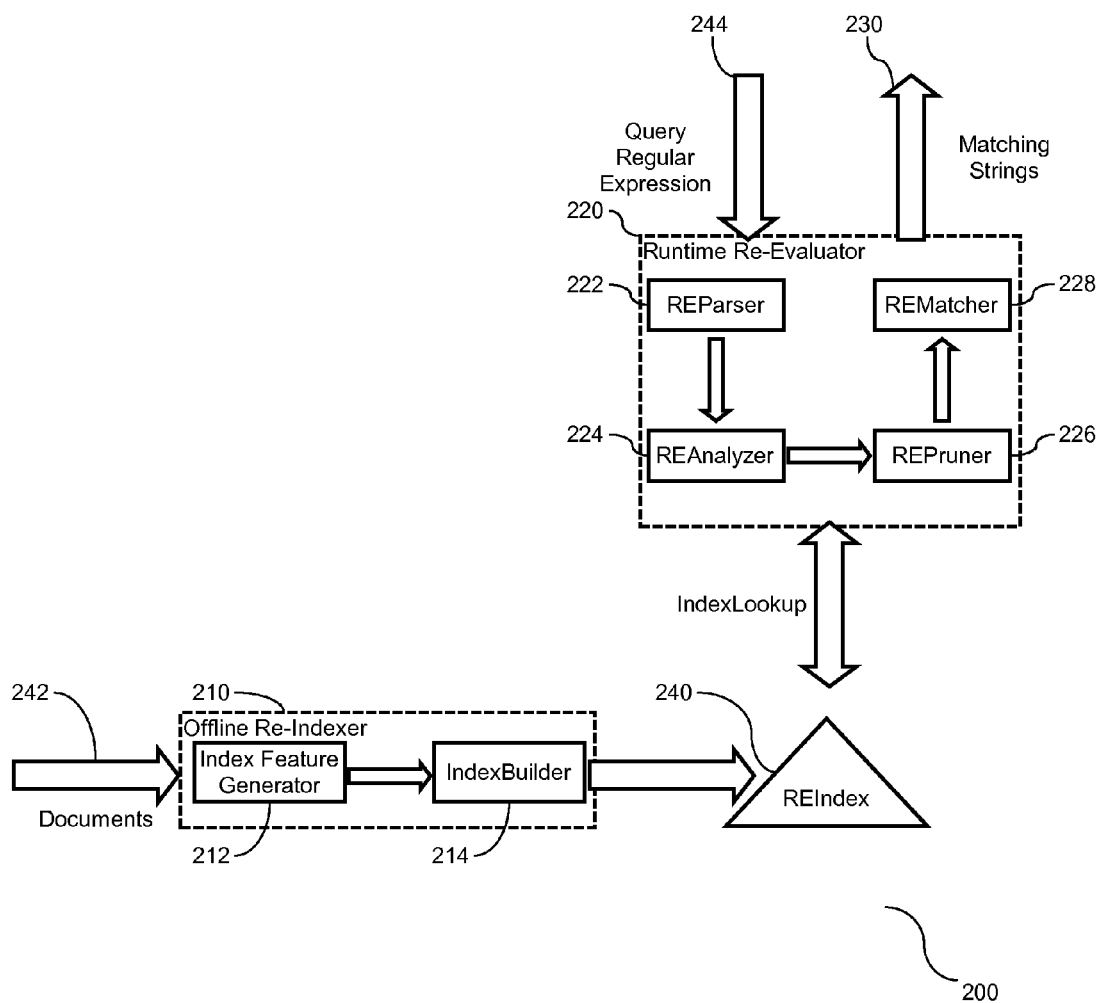
FIG. 2 is a block diagram of a regex evaluation system that can exploit indexes to evaluate regexs according to the preferred embodiment of this invention, and is suggested for printing on the first page of the issued patent.

FIG. 2 is a block diagram (200) of a regex evaluation system that can exploit electronic indexes to evaluate regexs. There are two primary components to the system, an indexer (210) and an evaluator (220). In an offline process, the indexer (210) creates electronic indexes over the input document collection (242) to maintain metadata about various index terms. The electronic indexes may be stored in a memory device or data storage device, for example. The indexer (210) employs two components, including a generator (212) and a builder (214). The generator (212) processes individual documents (242) and extracts index terms at the same time as accumulating metadata about these index terms. In this disclosure, an individual document is an electronic document which represents a particular physical/tangible document (e.g., before and/or after the physical/tangible document is converted to and/or from electronic form). Each index term can be a sequence of symbols, where each symbol is a character or a character class for each index term maintained in the index. Examples of characters include, but are not limited to, alphanumeric characters and non-alphanumeric characters, and examples of character classes include, but are not limited to, matching a digit and/or matching an alphanumeric character. In one embodiment, the syntax for matching a digit may be d and the syntax for matching an alphanumeric character may be \p {alpha}. Similarly, an example of an index term is a sequence of characters or character classes. In one embodiment, the syntax for an index term is <\d-\d>. An index term together with its metadata is referred to as an index feature. For example, with respect to counting the number of times an index term is found in a document, the syntax for this index feature is Count (d, t), where d is the document and t is the index term. Individual symbols may also be included as an index term. In one embodiment, regexs for information extraction may be designed to capture the intuition that specific characters and character classes may appear in a sequence. For example, maintaining information about distance between a pair of symbols can contribute to pruning documents. In one embodiment, symbol sequences, where symbols do not appear consecutively in a match and are frequently referred to as non-contiguous symbol sequences, may be employed as an index term. The number of candidate index terms may grow as longer symbol sequences are considered. As such, in one embodiment a maximum length of symbol sequences may be considered.

The builder (214) stores index features containing different metadata in appropriate index structures. Simple metadata, such as the list of documents in which an index term appears, are stored in a postings list. Conversely, more complex metadata, such as distance between index terms, are stored in a relational store. Accordingly, the generator (212) and the builder (214) are the two components employed to build the index (240).

Figure 4:
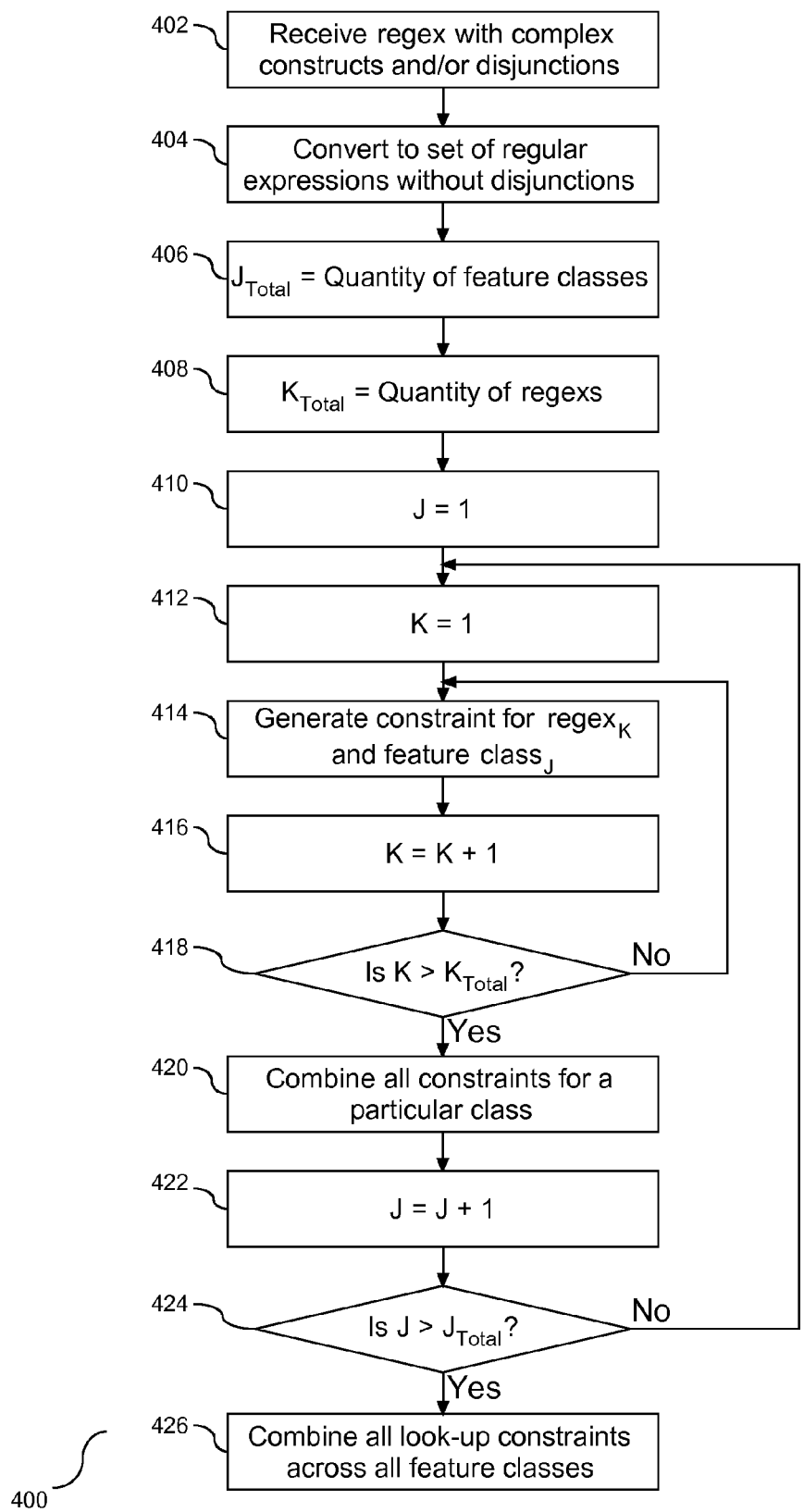
FIG. 4 is a flow chart illustrating the process for constructing an index lookup constraint.

The evaluator (220) is an online module that uses the index at run-time to efficiently identify the matches in the document collection for a regex query (244). Components within the evaluator include a parser (222), an analyzer (224), a pruner (226), and a matcher (228). FIG. 4, as described below, describes the regex constructs exploited by the evaluator (220). The parser (222) takes the regex query and re-writes it to a normalized representation which produces a strict superset of documents compared to the query regex, thereby guaranteeing that the final results are not affected by the re-write. The analyzer (224) is in communication with the parser (222). More specifically, the analyzer (224) takes the normalized regex and identifies a set of constraints that need to be satisfied by every document containing a match for the query. In one embodiment, the analyzer (224) will only generate constraints for index terms present in the index. The pruner (226) is in communication with the analyzer (224) and the index (240), and functions to identify the set of documents that satisfy the constraints generated by the analyzer (224) through the index (240). More specifically, the pruner (226) consults the expression over the index (240) by translating the constraints into appropriate index lookup queries to identify a subset of documents that may contain a match for the query regex, evaluate the queries over the underlying indexes, and merge the results. Finally, the matcher (228) is in communication with the pruner (226) and functions to evaluate the original query regex (244) over every document returned by the pruner (226). More specifically, the matcher (228) verifies the matches communicated by the pruner (226) and returns a set of matching strings (230).

Figure 3:
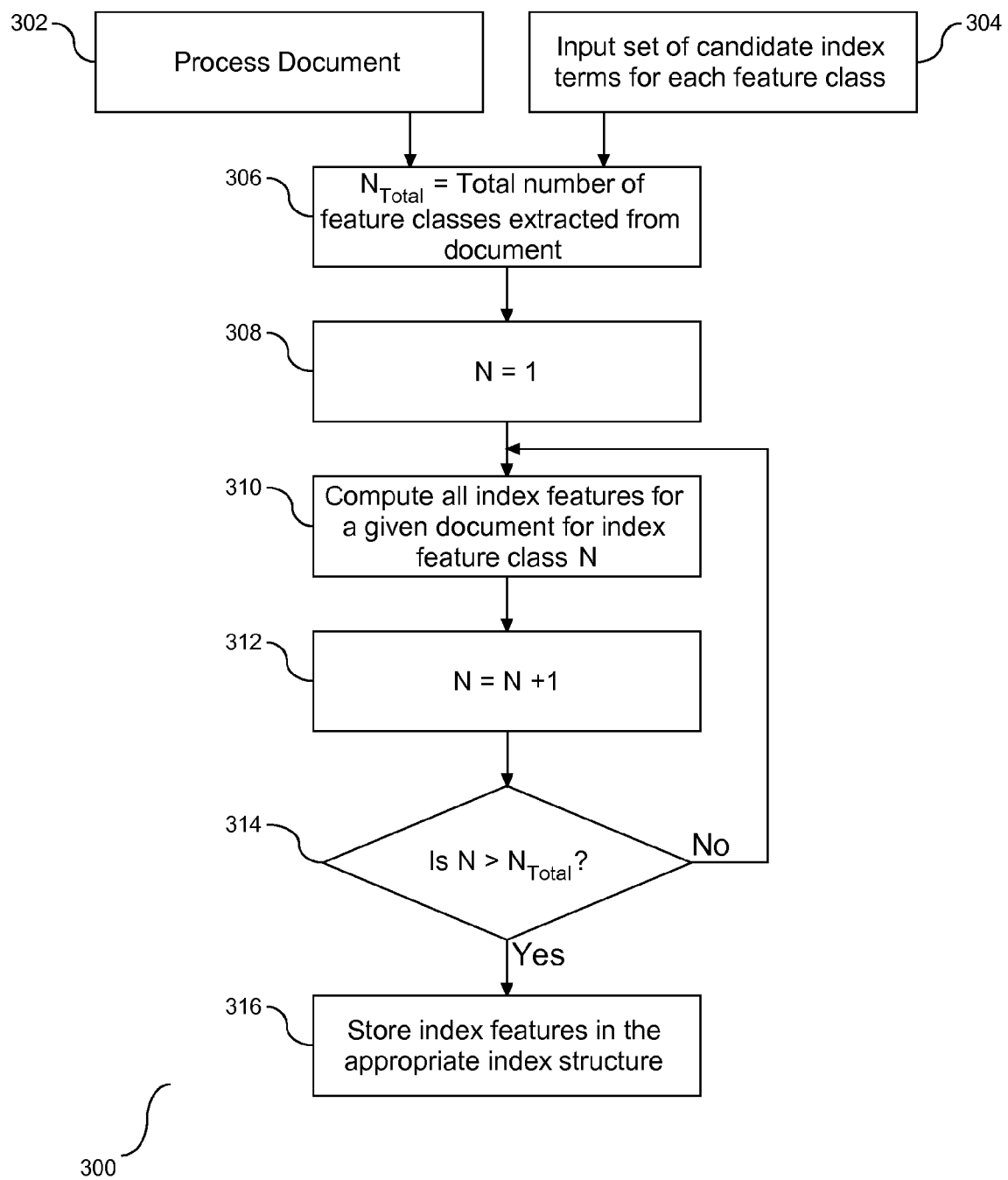
FIG. 3 is a flow chart illustrating how the index generator builds an index.

As described above, the system architecture employs an indexer (210) to build an index for filtering documents. FIG. 3 is a flow chart (300) illustrating how the index generator (212) builds an index. The process illustrated below illustrates the creation of the index for a single document. Initially, the subject document is processed (302) and a set of candidate index terms are input for each feature class (304), to identify index terms for the document (304). Following steps (302) and (304), the variable $N_{Total}$ is assigned to the total number of feature classes extracted from the document (306), and a counting variable, N, is set to the integer 1 (308). For each feature class$_N$, the index features for a given document are computed (310). In one embodiment, optimizations may be included with the aspect of computing an index feature. Examples of such optimizations include, but are not limited to, retaining selective index terms and maintaining a set of prefix-free index terms for each feature class. Such optimizations may be employed to keep the index to a manageable size. An index feature is the most basic information to maintain abut an index term that appears in a particular document. There are four subject index feature classes. The first index feature class is known as a count index feature class, and it pertains to the exact number of times an index term appears in a given document. The second index feature class is known as the MinWindow class. This class maintains the size of the minimum window of text in a document that matches a given index term. In one embodiment, the minimum window of text may be the length of the smallest substring in a document that matches a given index term. The third index feature class is known as the RestWindow class. This class allows for restrictions to be placed on the characters permitted between the symbols of an index term. In addition, this class checks whether the index term appears in the document such that any additional character that appears within such an occurrence belongs to the symbol set. The fourth index feature class is known as the k-gram. This class identifies whether a given symbol sequence appears contiguously in the document. Both the MinWindow and the RestWindow classes are only applicable to non-contiguous symbol sequences; both of these classes hinge on how many and what characters appear between symbols. Although only four index feature classes have been defined herein, the invention should not be limited to these categories of index feature classes. In one embodiment, the invention may be expanded to include additional or alternative index feature classes. Accordingly, metadata for the subject index term is computed based upon the defined index feature classes.

Following step (310), the counting variable N is incremented (312). It is then determined if all of the feature classes have been evaluated (314). A negative response to the determination at step (314) is followed by a return to step (310). Conversely, a positive response to the determination at step (314) is followed by storage of the index features in the appropriate index structure (316). Accordingly, the first component of the indexer is an index generator (212) that identifies index term, extracts associated metadata, and associates the metadata with the identified index term.

At run-time, the evaluator (220) uses the index to efficiently identify the matches for the regex in the document collection. There are four components to the evaluator (220) as described briefly in the description of FIG. 2. The parser (222) is the element that is in receipt of the query regex (244). More specifically, the parser (222) receives the query regex (244) as input, and converts the query regex (244) to a normalized representation by rewriting the original regex and taking into account both standard and complex operators. The normalized regex produces a strict subset of documents compared to the input query regex. The parser communicates the normalized representation to the analyzer (224), where the analyzer constructs an index lookup constraint.

FIG. 4 is a flow chart (400) illustrating the process for constructing an index lookup constraint. A regex with complex constructs and/or with disjunctions is received as input (402), and is converted to a set of regexs without disjunctions (404). This process of converting a regular expression into a set of disjunct free regular expressions is shown in detail in FIG. 6. A regular expression is disjunct free if the regex does not have any disjunctions, and does not have any quantifiers over regular expression groups. In one embodiment, only one branch in a disjunction needs to be satisfied in a match. Symbols that appear in a particular branch of the disjunction do not need to appear in every matching string. Following step (404), the variable $J_{Total}$ is assigned to the quantity of feature classes in the converted regex (406), and the variable $K_{Total}$ is assigned to the quantity of regexs (408). The variable J is assigned to the integer one (410), and the variable K is assigned to the integer one (412). The variable J is employed as a counting variable for the feature classes, and the variable K is employed as a counting variable for the regexs. A constraint is generated for $regex_K$ and $feature\ class_j$ (414). The process of generating constraints for a disjunction free regex differs for the different feature classes. For the Count feature class, the constraint is determined by the minimum number of times that the index term appears; for the MinWindow feature class, the constraint is determined by how far apart the index term may span; and for the RestWindow feature class, the constraint is determined by what symbols set is allowed in between non-contiguous symbol sequences. The counting variable K is incremented (416), and it is determined if the there are any more regexs with $feature\ class_j$ that have not had a constraint generated (418). A negative response to the determination at step (418) is followed by a return to step (414). Conversely, a positive response to the determination at step (418) is followed by combining all constraints for a particular class (420). In one embodiment, the process of combining the all of the constraints, i.e. index lookup queries, for a particular class, employs a combiner algorithm specific to the feature class. As noted above, there may be more than one feature class. Following step (420), the variable J is incremented (422), followed by a determination as to whether the regexs have been evaluated for each feature class present in the index (424). A negative response to the determination at step (424) is followed by a return to step (412). Conversely, a positive response to the determination at step (424) is an indication that constraints have been generated for each regex and each feature class. Following a positive response to the determination at step (424), all look-up constraints across all feature classes are combined (426). In other words, the final constraint is the conjunction of the constraints for all of the feature classes. The process illustrated in FIG. 4 relies on the fact that disjunction free regex can be directly analyzed for each index feature class.

Computing lookup constraints across all feature classes is complicated when the query regex contains complex regex constructs, such as qualifiers and groups. In one embodiment, complex regex constructs may be converted into multiple disjunction free regexs so that they each may be directly analyzed, and then compiled together with the final constraint. More specifically, all the quantifiers of the expression are expanded, and any remaining groups with disjunctions are further expanded to obtain a set of disjunction free regexs.

Figure 5:
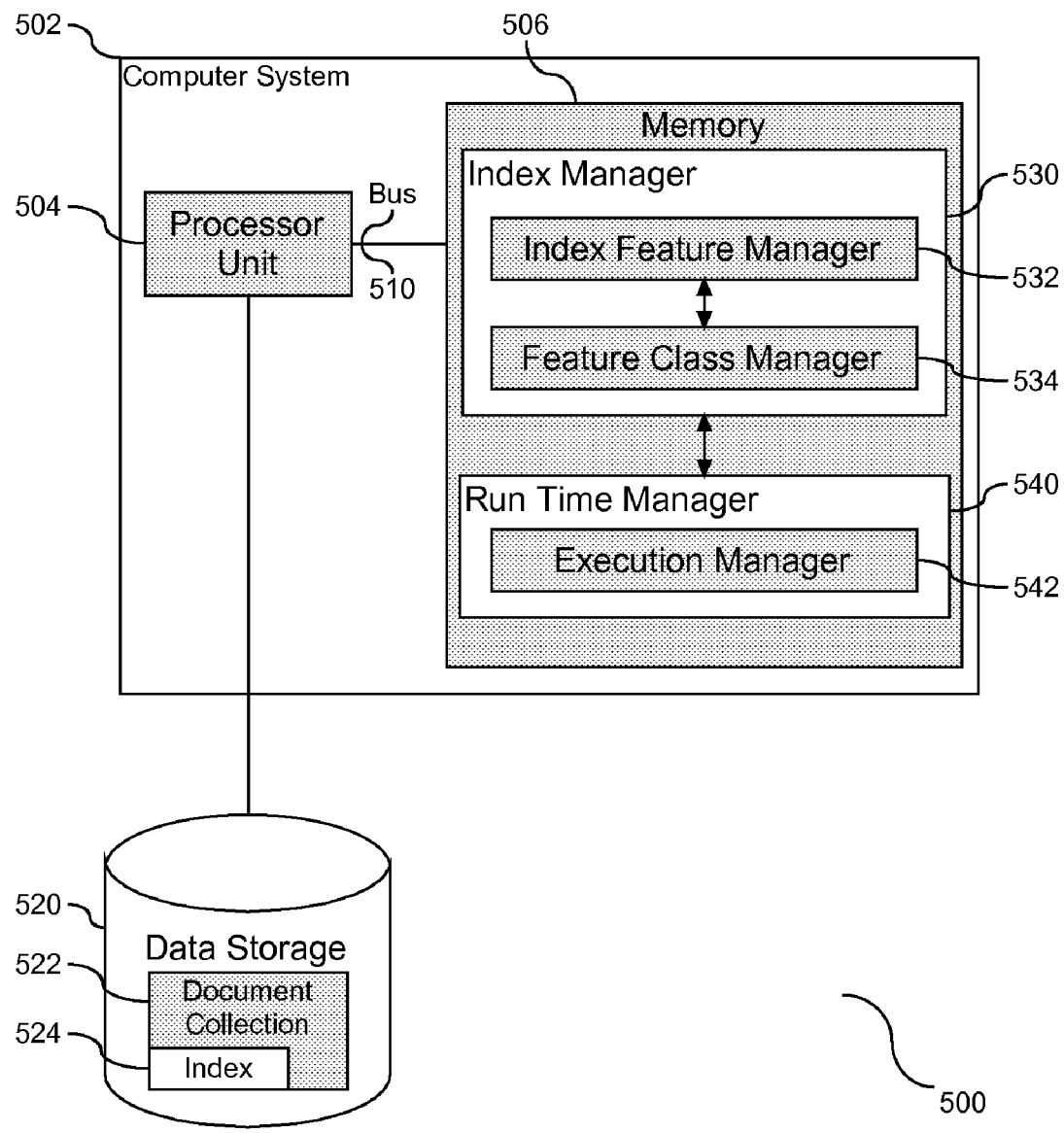
FIG. 5 is a block diagram illustrating placement of an extraction management tool in a computer system.

FIG. 5 is a block diagram (500) illustrating placement of a regex for information extraction tool in a computer system. The illustration shows a computer system (502) with a processor unit (504) coupled to memory (506) by a bus structure (510). Although only one processor unit (504) is shown, in one embodiment, the computer system (502) may include more processor units in an expanded design. The computer system (502) includes data storage (520) in communication with the processor unit (504). The data storage (520) is employed for retention of a collection of documents (522).

An index manager (530) is provided local to the system to build an index (524) to support efficient evaluation of complex regexs. The index manager (530) is comprised of several components to support the building of the index (524). More specifically, the index manager (530) includes an index feature manager (532) and a feature class manager (534). The index feature manager (532) specifies index feature classes to identify metadata to be stored in the index (524) of the collection of documents (522). More specifically, the index feature manager (532) describes the index terms about which the metadata is maintained by the index feature class. Index terms include, but are not limited to, sequences of characters and character classes, and a sequence appearance in the collection of documents may be either contiguous or non-contiguous. The feature class manager (534) applies the feature class over the collection of documents (522) to generate the index storing the metadata. The feature class manager (534) generates the index (524) that stores the metadata. More specifically, the feature class manager (534) provides user configuration to control the index terms that are relevant for each feature class, computers the selective index terms, and defines appropriate entries that are to be inserted into the index for each feature class. In one embodiment, the index is a scalable index. A run time manager (540) is provided in communication with the index manager (530). The run time manager (540) is responsible for generating a query based on the regular expression, and with the support of an execution manager (542), executes a query based on the regex. The execution manager (542) normalizes the regex, generates an index look-up constraint, combines all of the index look-up constraints for a particular index feature class, and combines the index look-up constraints across all of the feature classes. The query may include multiple constraints, with each constraint associated with one of the feature classes. The execution manager (542) executes the query over the index (524) to identify a set of documents (526) in the collection of documents (522) over which the query can be evaluated. The identified set of documents (526) is returned for evaluation by the regex.

As shown herein, the index manager (530), the index feature manager (532), the feature class manager (534), the run time manager (540), and the execution manager (542), each reside in memory (506) local to the computer system. In one embodiment, each of the managers (530), (532), (534), (540), and (542) may reside as hardware tools external to local memory (506), or that may be implemented as a combination of hardware and software. Similarly, in one embodiment, the managers (530), (532), (534), (540), and (542), may be combined into a single functional item that incorporates the functionality of the separate items. Furthermore, as shown herein each of the managers (530), (532), (534), (540), and (542) are local to the computer system (502). However, in one embodiment they may be collectively or individually distributed across a network and function as a unit to extract data from a regex. Accordingly, the managers (530), (532), (534), (540), and (542) may be implemented as software tools, hardware tools, or a combination of software and hardware tools, to index and extract data from a document collection.

Figure 6A:
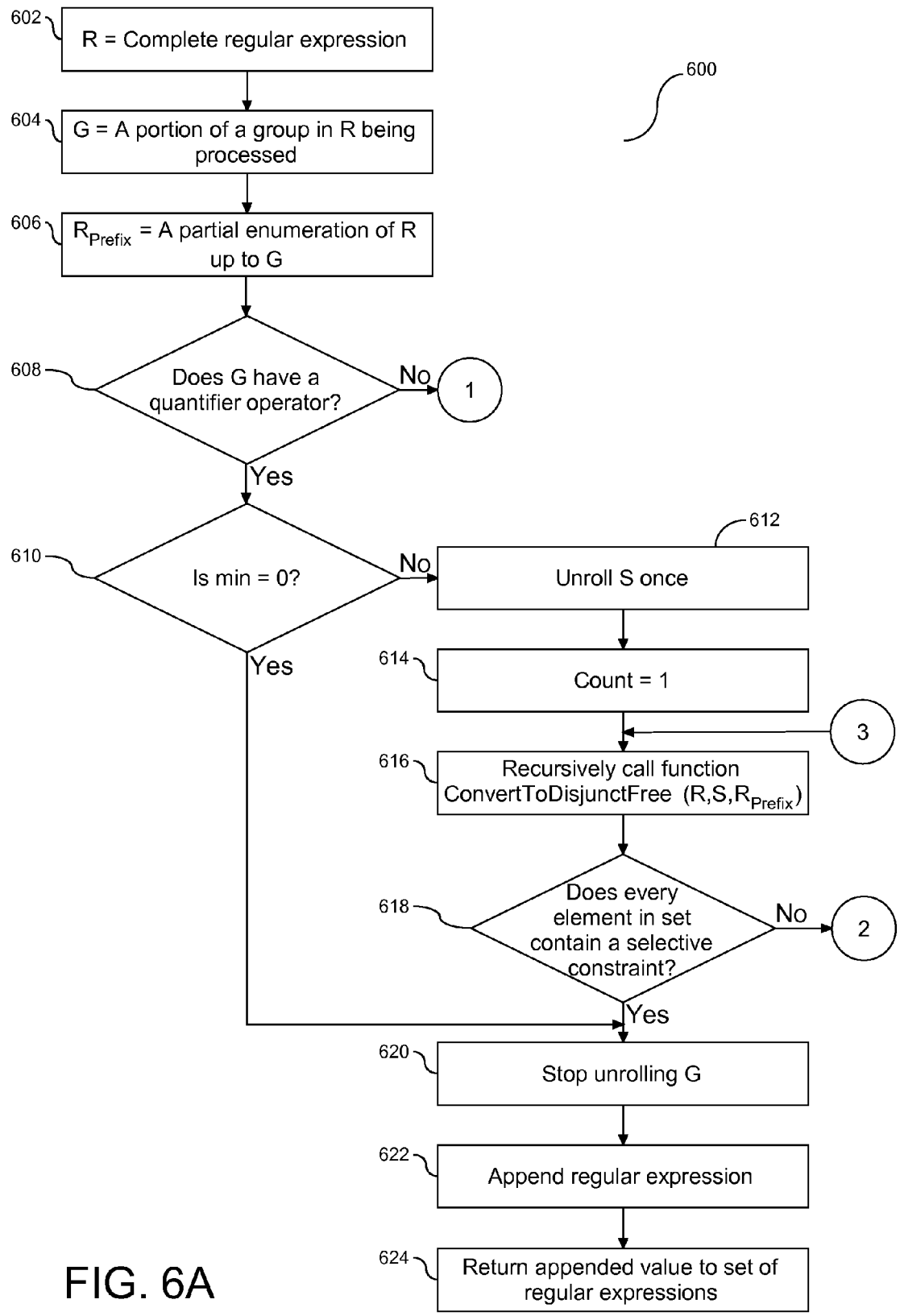
FIGS. 6A-6C are a flow chart illustrating the process of converting a complex regular expression into a set of disjunct free regular expressions.
Figure 6B:
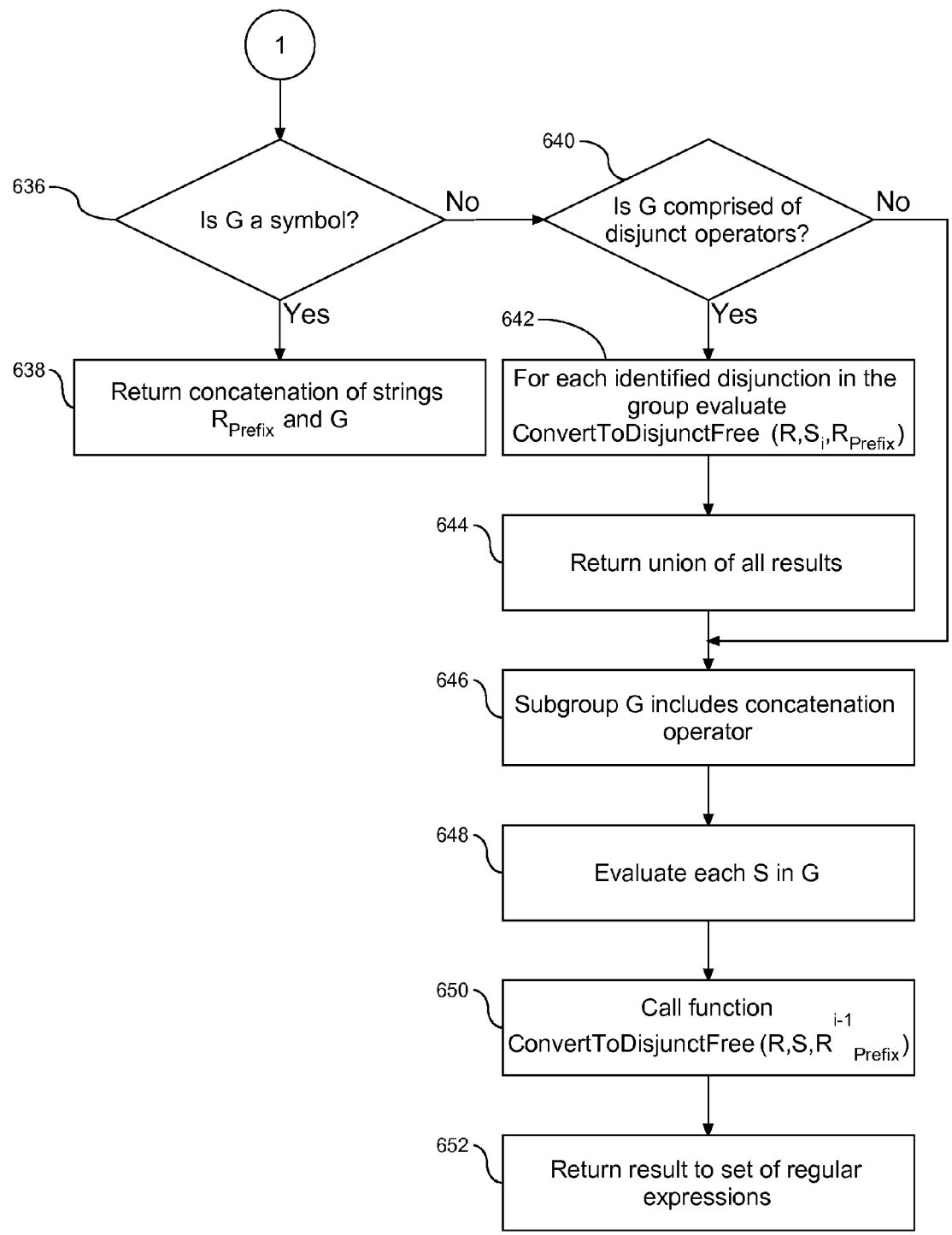
Figure 6C:
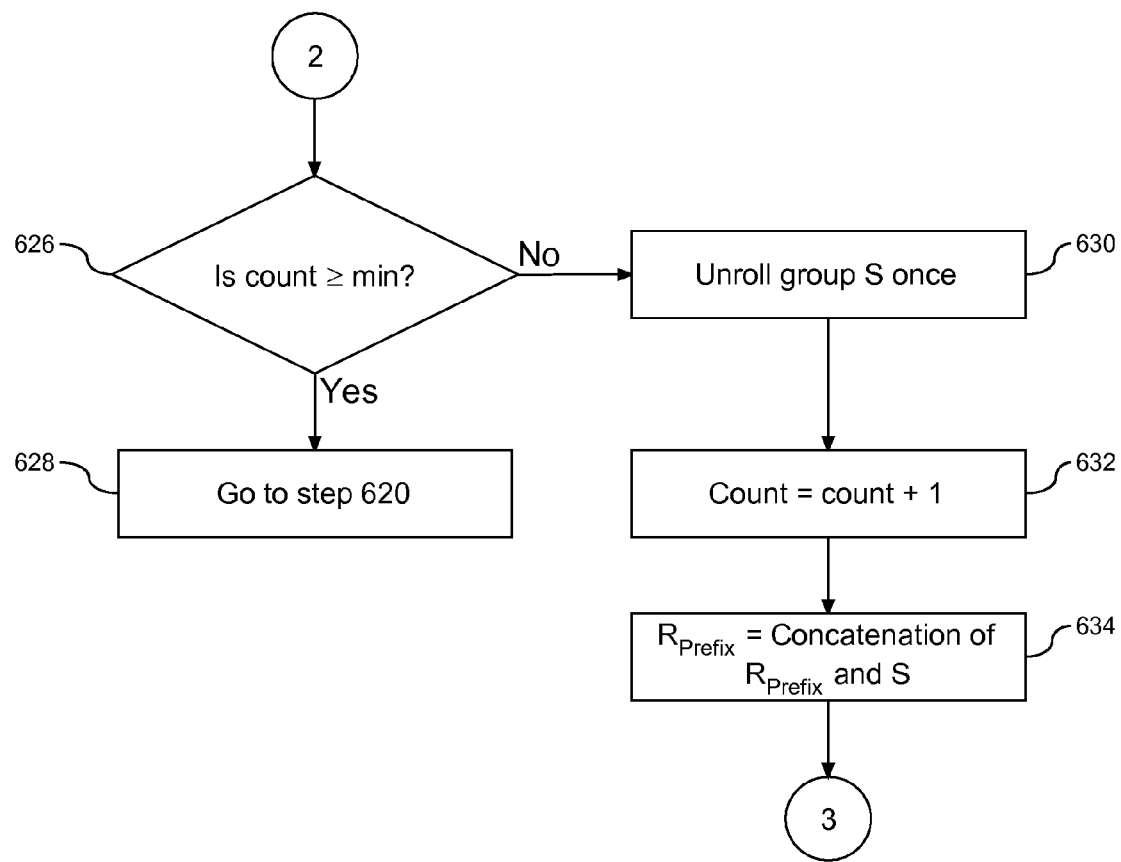

As noted above, the process of building an index to support efficient evaluation of complex regular expressions includes converting a regular expression into a union of disjunct-free regular expression queries. FIGS. 6A-6C are a flow chart (600) illustrating an algorithm employed to convert a regular expression, R, into a set of disjunct free regular expressions. The variable R represents a complete regular expression (602); the variable G represents a portion of a group in R being processed (604); and the variable $R_{prefix}$ represents a partial enumeration of R up to G (606). A portion of the regular expression being evaluated can be one of four types, including a quantifier operator, a symbol, a disjunct operator, and a concatenation operator. The following tests are employed to determine the operator type. However, the order by which they are presented is no restrictive. In one embodiment, the tests may be re-ordered from that presented herein to determine the operator type.

Following step (606), it is determined if the current group, G, in the regular expression, R, being processed is in the form of a quantifier operator (608). In one embodiment, the syntax for the determination at step (608) is if G is of the form of S {min, max}, with S representing a subgroup, and min and max being operators representing the number of times subgroup S can repeat. A positive response to the determination at step (608) is followed by determining whether the min integer has a zero value (610). Similarly, a positive response to the determination at step (610) is followed by a jump to step (620), and a negative response to the determination at step (610) is following by rewriting the expressions of the subgroup as a set of disjunct free expressions. Initially, the group S is unrolled once (612), and a counting integer, Count, is set to the value of one (614). Following step (614), a recursive call is made to the function, ConvertToDisjunctFree (R, S, $R_{Prefix}$) to obtain a set of disjunct free regular expressions, CandidateRE, for the identified subgroup, S (616). Following step (616) it is determined if every element in the set of disjunct free regular expressions contains a selective constraint (618). A positive response to the determination at step (618) is followed by a stop of the unrolling process for the current group in R being processed, G, (620), and appending every regular expression in every element in the set of candidates to the maximum width of the subgroup S (622). Following step (622), the appended value is returned to the set of regular expressions Candidate RE (624). In contrast, a negative response to the determination at step (618) is followed by a query to determine if the variable, count, is greater than or equal to the input parameter integer min (626). A positive response is followed by proceeding to step (620), and a negative response is followed by unrolling the group S once (630) incrementing the count variable (632), and setting the variable $R_{Prefix}$ to a concatenation of $R_{Prefix}$ and S (634). Following step (634), the process returns to step (616) for further processing.

As noted above, there are different operator types that may be present in a non-disjunct free regular expression. Following a negative response to the determination at step (608), it is determined if G is a symbol (636). A positive response to the determination at step (636) is followed by a return of the concatenation of the strings $R_{Prefix}$ and G (638). In contrast, a negative response to the determination at step (636) is followed by a determination as to whether G is comprised of one or more disjunct operators (640). A positive response to the determination at step (640) is followed by evaluating the function ConvertToDisjunctFree (R, $S_i$, $R_{Prefix}$) for each identified disjunction in the group (642), and returning a union of all of the results (644). Finally, a negative response to the determination at step (640) is an indication that the subgroup G includes a concatenation operator (646), represented as G is of the form ($S_1$, $S_2$, ... $S_k$). Each of the groups, $S_1$ to $S_k$ are evaluated one at a time starting with group $S_1$ and ending with group $S_k$ (648) with a calling of the function ConvertToDisjunctFree (R, S, $R^{i-1}_{Prefix}$) for each processing group S (650). When the processing is completed for each processing group, the now disjunct free results are returned to the set of regular expressions (652).

The process outlined in FIGS. 6A-6C demonstrates expanding processing groups and quantifiers in the regular expression, unrolling the processed groups with associated quantifiers, identifying any selective constraints, and concluding the step of unrolling a quantifier responsive to finding a selective constraint. Furthermore, the process of generating the index lookup constraint for a disjunct free regular expression query for a particular feature class pair is demonstrated to include using a constraint generation algorithm for disjunct free regular expressions specific to the feature class. Accordingly, as demonstrated in this figure, a regular expression may be converted into a union of disjunct-free regular expression queries for ease of evaluating the complex regular expression.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages of the Exemplary Embodiment Over the Related Art

An index is built for filtering documents for a collection of documents by applying an indexing policy over the collection of documents. The index includes characters, character classes, and metadata for each index entry. In response to receipt of a regex, a query is applied to the index. By building the index to handle regexs at the character level, including character classes, identifying a match of a set of documents is efficiently handled. The efficiency is accomplished by creating an expressive index and carefully exploiting it when presented with a query regex. Increasing expressivity in the index is obtained by including characters, character classes, and metadata for each entry. Accordingly, an increased expressivity is exploited by an efficient algorithm during processing of a query that derives appropriate look-ups over the index.

Alternative Embodiments

It will be appreciated that, although specific embodiments of the invention have been described herein for purposes of illustration, various modifications may be made without departing from the spirit and scope of the invention. In particular, new index feature classes can be incorporated by defining the corresponding index features and providing algorithms to compute these index features from a given document, generate an index lookup constraint for disjunct free regular expressions, and combine multiple constraints specific to the feature classes. Similarly, an alternate algorithm can be employed to convert a complex regular expression into a set of disjunct free regular expressions. Accordingly, the scope of protection of this invention is limited only by the following claims and their equivalents.

We claim:

1. A method for building an electronic index to support efficient evaluation of complex regular expressions, comprising:
specifying index feature classes to extract index terms from a collection of documents and to identify metadata associated with the index terms to be stored in an electronic index of the collection of documents, wherein each index term is a sequence of characters and character classes and each character class is a variable representing characters from a pre-determined set of characters;
applying the feature classes over the collection of documents to generate the index storing the metadata;
receiving a query regular expression, wherein the query regular expression is composed of multiple constraints and wherein each constraint is associated with one of the feature classes;
extracting the constraints from the query regular expression and transforming said constraints into a new query over the index;
executing the new query over the index to identify a subset of documents in the collection of documents over which the regular expression query can be evaluated; and
returning the identified subset of documents over which the regular expression is queried.

2. The method of claim 1, wherein specifying index feature classes includes describing the index terms about which the metadata is maintained by the index feature class, wherein the index terms comprise sequences of characters and character classes, and wherein a sequence appearance in the collection of documents is selected from the group consisting of: contiguous and non-contiguous.

3. The method of claim 2, wherein index feature classes comprise:
a count feature class, wherein, for each document, a count of a number of times a given index term appears in each document is stored in the index;
a MinWindow feature class for maintaining, for each document, a size of a minimum substring in a document that contains a given index term;
a RestWindow feature class for identifying, for each document, if given an index term and a symbol set whether the index term appears in the document such that any additional character that appears within such an occurrence belongs to the symbol set; and
a k-gram feature class for identifying, for each document, if a given index term appeared in the document.

4. The method of claim 1, wherein applying the feature classes over a document collection includes:
providing user configuration to control the index terms that are relevant for each feature class;
computing selective index terms; and
defining appropriate entries to be inserted into a scalable index for each feature class.

5. The method of claim 1, wherein generating a query based on the regular expression comprises:
normalizing the regular expression, including rewriting the regular expression into a union of disjunct-free regular expression queries;
generating an index lookup constraint for each disjunct free regular expression query and feature class pair;
combining all the index lookup constraints for a particular index feature class; and
combining the index lookup constraints across all the feature classes.

6. The method of claim 5, wherein rewriting the regular expression into a union of disjunct free regular expression queries comprises:
expanding processing groups and quantifiers in the regular expression;
unrolling the processed groups with associated quantifiers and identifying any selective constraints; and
concluding the step of unrolling a quantifier responsive to finding a selective constraint.

7. The method of claim 5, wherein generating an index lookup constraint for a disjunct free regular expression query for a particular feature class pair comprises: using a constraint generation algorithm for disjunct free regular expressions specific to the feature class.

8. The method of claim 5, wherein combining the index lookup constraints for a particular feature class includes using a combiner algorithm specific to the feature class.

9. The method of claim 1, wherein specifying index feature classes includes:
defining an index feature consisting of an index term and associated metadata;
computing index features from a given document;
storing the index features in an index;
generating an index lookup constraint for disjunct free regular expressions; and
combining multiple constraints specific to the feature classes.

10. A computer system comprising:
a processor unit in communication with memory;
an index manager in communication with the memory, the index manager to build an index to support efficient evaluation of complex regular expressions, the index manager comprising:
an index feature manager to specify index feature classes to extract index terms from a collection of documents and to identify metadata associated with the index terms to be stored in an index of the collection of documents, wherein each index term is a sequence of characters and character classes and each character class is a variable representing characters from a pre-determined set of characters;
a feature class manager in communication with the index feature manager to apply the feature classes over the collection of documents to generate the index storing the metadata;
a run time manager in communication with the index manager, the run time manager to extract constraints from a query regular expression and to transform said constraints into a new query over the index wherein each constraint is associated with one of the feature classes;
responsive to receipt of a new query regular expression, an execution manager to execute the new query over the index to identify a subset of documents in the collection of documents over which the regular expression query can be evaluated; and the identified subset of documents returned for evaluation by the regular expression responsive to execution of the query over the index.

11. The system of claim 10, wherein the index feature manager describes the index terms about which the metadata is maintained by the index feature class, wherein the index terms comprise sequences of characters and character classes, and wherein a sequence appearance in the collection of documents is selected from the group consisting of: contiguous and non-contiguous.

12. The system of claim 11, wherein index feature classes comprise:
a count feature class, wherein, for each document, a count of a number of times a given index term appears in each document is stored in the index;
a MinWindow feature class to maintain, for each document, a size of a minimum substring in a document that contains a given index term;
a RestWindow feature class to identify, for each document, if given an index term and a symbol set whether the index term appears in the document such that any additional character that appears within such an occurrence belongs to the symbol set; and
a k-gram feature class to identify, for each document, if a given index term appeared in the document.

13. The system of claim 10, wherein the feature class manager applies the feature classes over a document collection including the feature class manager to:
provide user configuration to control the index terms that are relevant for each feature class;
compute selective index terms; and define appropriate entries to be inserted into a scalable index for each feature class.

14. The system of claim 10, wherein the generated query based on the regular expression employs the execution manager to:
normalize the regular expression, including rewriting the regular expression into a union of disjunct-free regular expression queries;
generate an index lookup constraint, for each disjunct free regular expression query and feature class pair;
combine all the index lookup constraints for a particular index feature class; and
combine the index lookup constraints across all the feature classes.

15. An article configured to build an index to support efficient evaluation of complex regular expressions, the article comprising:
a storage device storing computer program instructions when executed to build the index, the instructions comprising:
instructions to specify index feature classes to extract index terms from a collection of documents and to identify metadata associated with the index terms to be stored in an index of the collection of documents, wherein each index term is a sequence of characters and character classes and each character class is a variable representing characters from a pre-determined set of characters;
instructions to apply the feature classes over the collection of documents to generate the index storing the metadata;
instructions to receive a query regular expression, wherein the query regular expression is composed of multiple constraints and wherein each constraint is associated with one of the feature classes;
instructions to extract the constraints from the query regular expression and to transform said constraints into a new query over the index;
instructions to execute the new query over the index to identify a subset of documents in the collection of documents over which the regular expression query can be evaluated; and
the identified subset of documents returned for evaluation by the regular expression responsive to execution of the query over the index.

16. The article of claim 15, wherein index feature classes comprise:
a count feature class, wherein, for each document, a count of a number of times a given index term appears in each document is stored in the index;
a MinWindow feature class for maintaining, for each document, a size of a minimum substring in a document that contains a given index term;
a RestWindow feature class for identifying, for each document, if given an index term and a symbol set whether the index term appears in the document such that any additional character that appears within such an occurrence belongs to the symbol set; and
a k-gram feature class for identifying, for each document, if a given index term appeared in the document.

17. The article of claim 15, wherein the instructions to apply the feature classes over a document collection includes:
providing user configuration to control the index terms that are relevant for each feature class;
computing selective index terms; and
defining appropriate entries to be inserted into a scalable index for each feature class.

18. The article of claim 15, wherein the instructions to generate a query based on the regular expression comprises:
normalizing the regular expression, including rewriting the regular expression into a union of disjunct-free regular expression queries;
generating an index lookup constraint, for each disjunct free regular expression query and feature class pair;
combining all the index lookup constraints for a particular index feature class; and
combining the index lookup constraints across all the feature classes.

19. The article of claim 18, wherein the instructions to rewrite the regular expression into the union of disjunct free regular expression queries comprises:
expanding processing groups and quantifiers in the regular expression;
unrolling the processed groups with associated quantifiers and identifying any selective constraints; and
concluding the step of unrolling a quantifier responsive to finding a selective constraint.

20. The article of claim 18, wherein the instructions to generate the index lookup constraint for a disjunct free regular expression query for a particular feature class pair comprises: using a constraint generation algorithm for disjunct free regular expressions specific to the feature class.

* * * * *